United States Patent [19]
Cory

[11] 4,027,479
[45] June 7, 1977

[54] VARIABLE DENSITY HEAT ENGINE

[76] Inventor: John S. Cory, 1436 View Point, Escondido, Calif. 92025

[22] Filed: May 6, 1976

[21] Appl. No.: 684,066

[52] U.S. Cl. .................... 60/527; 310/4 A; 60/641

[51] Int. Cl.² ............................ F03G 7/06

[58] Field of Search .......... 60/527, 528, 529, 641; 310/4 A

[56] References Cited

UNITED STATES PATENTS

| 3,316,415 | 4/1967 | Taylor | 60/527 |
| 3,321,908 | 5/1967 | Katchalsky | 60/527 |
| 3,403,238 | 9/1968 | Buehler | 60/527 X |

Primary Examiner—Allen M. Ostrager
Attorney, Agent, or Firm—Gausewitz, Carr & Rothenberg

[57] ABSTRACT

A heat engine employs an endless belt including a number of discrete elements which will interact with a force field, and are interconnected by a shape memory material, such as Nitinol. Two portions of the belt are maintained at different temperatures and the belt is constrained to move the elements in a continuous path into a field attracting the elements at the hot portion and out of the field at the cold portion. The cold portion is stretched and the hot portion contracts to maintain a condition of higher element density on the portion entering the field and thus a net force drives the belt about a pulley mounted on a power takeoff shaft.

38 Claims, 15 Drawing Figures

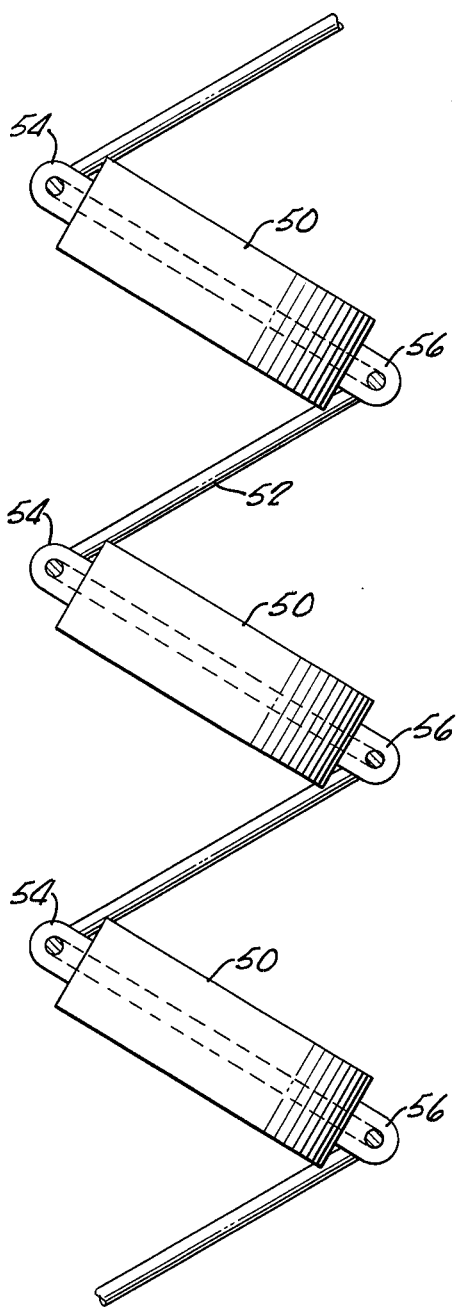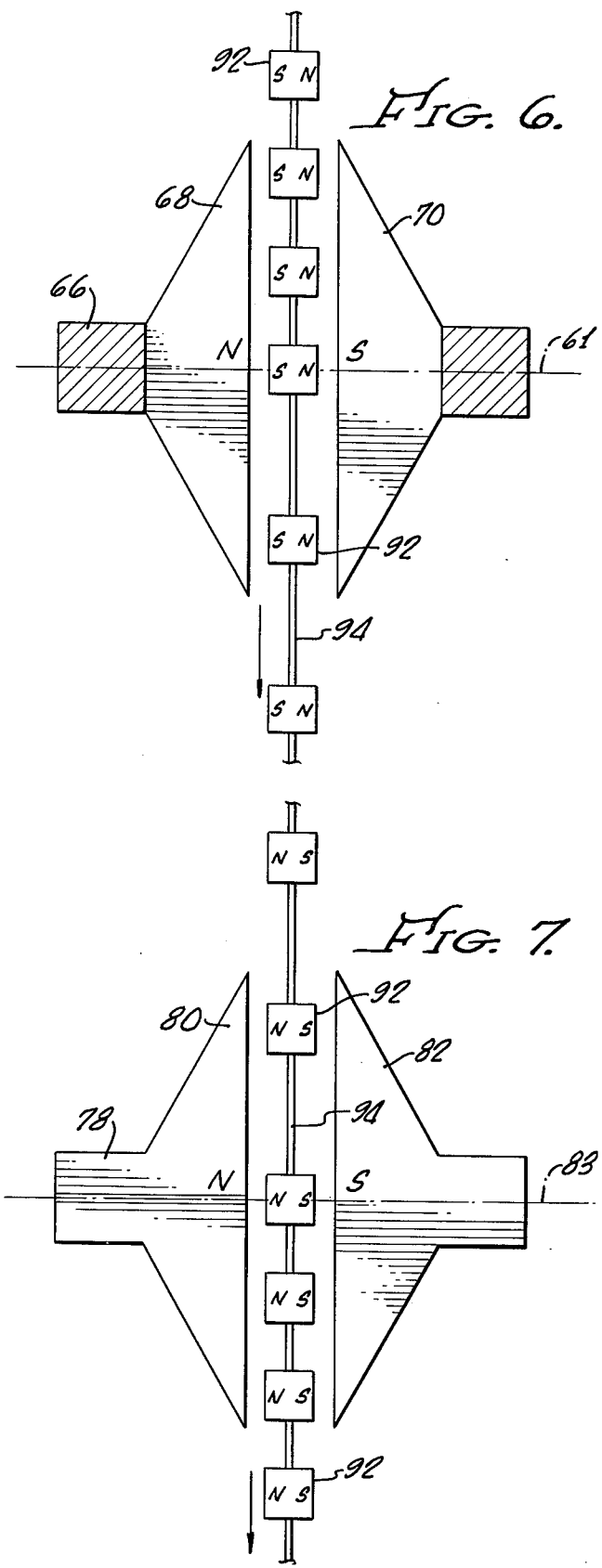

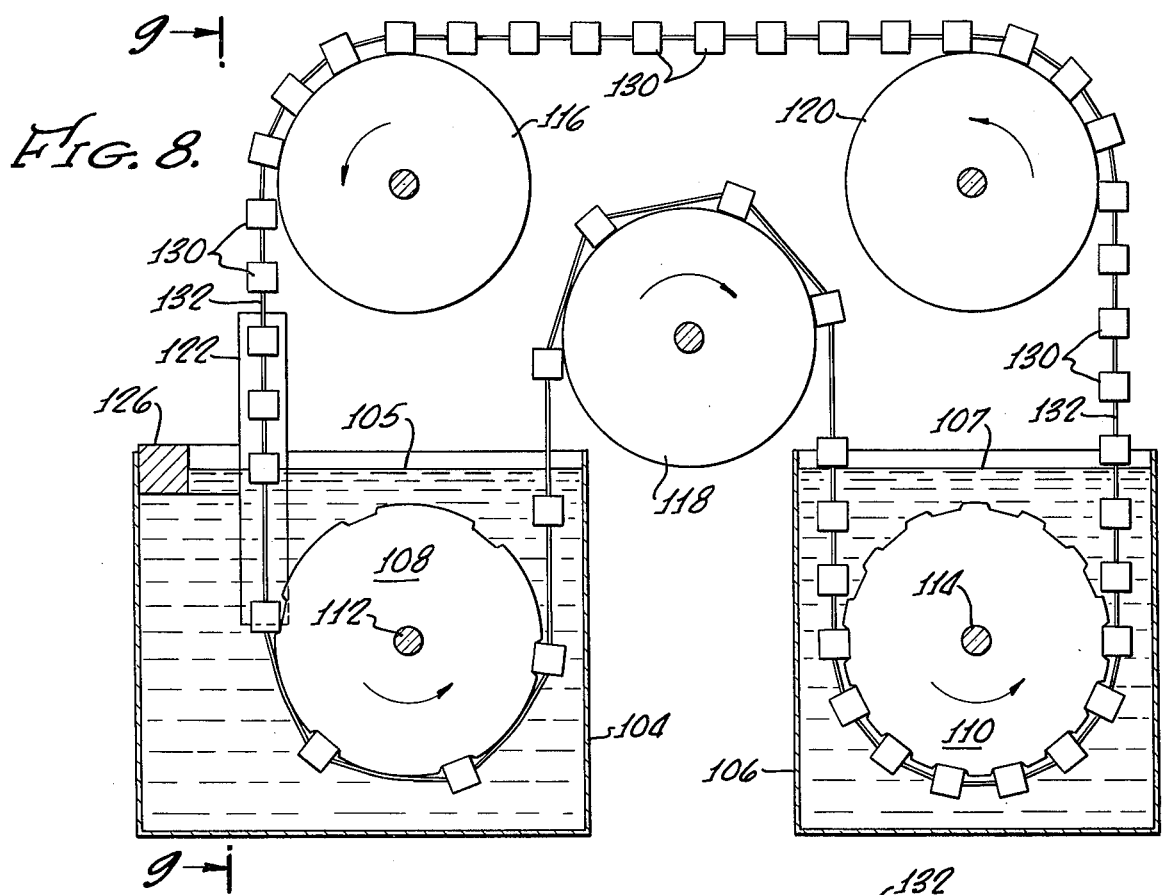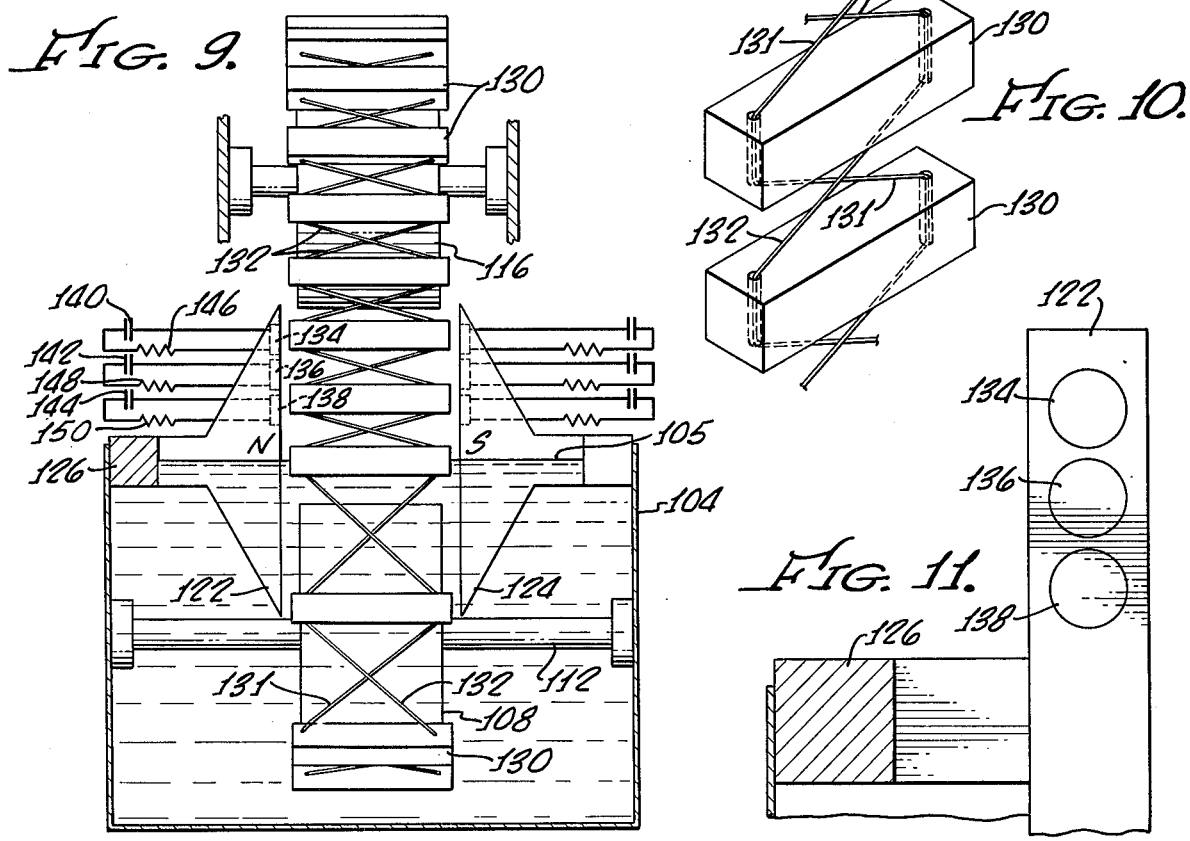

VARIABLE DENSITY HEAT ENGINE

BACKGROUND OF THE INVENTION

This invention relates to heat engines and more particularly concerns a thermal energy converter that utilizes a material that changes configuration with temperature to convert thermal energy into a useful mechanical output.

A class of materials which may be termed Joule effect or shape memory materials exhibits a non-linear relation between stress and strain, which relation can be reversed by a temperature change, usually exhibiting an hysteresis effect. Thus, as first observed by the British physicist, James Joule, if a rubber material is first stretched at a relatively lower temperature and then warmed, it tends to contract. Many other materials, such as alloys of copper and zinc, aluminum or tin, indium and thallium, gold and cadmium, iron and platinum and some ternary alloys, such as copper, aluminum, and nickel also exhibit the Joule effect. A material that presently appears to be a most efficient Joule effect of shape memory material is known as Nitinol, a titanium nickel alloy having a 53.5–56.5% nickel content by weight. Such a material and its use in conversion of heat energy to mechanical energy is described in the U.S. patent to Buehler et al, U.S. Pat. No. 3,403,238.

Operation of several types of shape memory materials is described in an article on pages 934, 935 and 936 of Science Magazine, Volume 191, dated Mar. 5, 1976. Basically, these materials are formed into a desired configuration and annealed at a high temperature to "fix" the material shape. The material is then cooled, and at low temperature is deformed from this "fixed" or low strain configuration. Then, if the material is heated it will return to its "fixed" or low strain configuration. The force generated in the return or reshaping to its low strain configuration at a higher temperature is considerably greater than the force required to deform the material from its low strain configuration at a lower temperature.

A number of different types of heat engines employing shape memory material and in particular, Nitinol are described in a paper entitled "Nitinol Heat Engines" presented by A. D. Johnson to the Intersociety Energy Conversion Conference in August of 1975. This paper is found on pages 530, 531, 532, 533 and 534 of the IECEC 1975 record.

A number of Joule effect engines employing rubber tubing are described in an article in Scientific American of August 1970, pages 118, 119, 120, 121 and 122.

The prior Joule effect or shape memory heat engines are of limited output power or of a complexity that greatly limits practical application, or both. Such machines frequently involve arrangements such as shown in the U.S. patent to Lee, U.S. Pat. No. 3,303,642. The Lee patent describes a thermal engine which utilizes a conventional thermally responsive material rather than a Joule effect material and thus is capable of producing only limited amounts of output energy. Nevertheless, the arrangement of Lee illustrates the fact that the pulley type of thermal engine requires excessively large pulley diameters for increased powers. Further, such a device, like the eccentrically mounted wheels shown in the Scientific American article, are subject to high bearing loads which increase to very large values for devices providing larger amounts of output energy.

Accordingly, it is an object of the present invention to provide a heat engine of greater simplicity and lower cost which eliminates or minimizes problems of prior heat engines.

SUMMARY OF THE INVENTION

In carrying out principles of the present invention, in accordance with a preferred embodiment thereof, a shape memory material is used to convert thermal energy into a density difference (a density difference of massive or magnetic or electrostatic elements) and this density difference is employed in a force field (inertial, gravitational, magnetic, or electrostatic) to produce motion that is converted to energy in a useful form. More specifically, a shape memory material is employed to interconnect a plurality of elements that react to a force field by a tendency to move relative to the field. Such relative elements may comprise the shape memory material itself. The shape memory material is deformed from a low temperature configuration to relatively position the elements in a first density. The deformed material is heated and reshaped toward said low temperature configuration to relatively position the elements in a second density wherein they are subjected to a force field that tends to move them relative to the field. The reshaped material is then cooled and the several steps are repeated.

An apparatus embodying principles of the present invention comprises an endless belt having reactive elements that tend to move in a force field and which are interconnected by a shape memory material so as to change the density of the elements as the shape memory material assumes different configurations. The belt is guided along a path through a force field and is caused to have an increased temperature in a section of the path so that the elements are in a second density as the belt traverses the path section. Thereafter, the shape memory material is cooled and deformed before it is again heated and guided through the path section in the force field.

BRIEF DESCRIPTION OF THE DRAWINGS

FIG. 4 illustrates a modified form of a belt having shape memory material;

FIGS. 6 and 7 depict belt density changes in the magnetic gaps of the embodiment of FIG. 5;

FIG. 8 shows another form of the invention employing a magnetic field operable upon magnetically permeable elements;

FIG. 9 is another view of the embodiment of FIG. 8;

FIG. 10 illustrates details of a fragment of the shape memory loop of FIG. 8;

FIG. 11 illustrates an arrangement of output induction coils in the magnet face of FIGS. 8 and 9;

DETAILED DESCRIPTION

Principles of the present invention are applicable in general to various types of thermally responsive materials, materials that respond to temperature variation by changing shape. However, the temperature induced forces are so much greater in the Joule effect materials that such materials are employed in all of the presently preferred embodiments.

In the following descriptions where a device is described as using masses to react with a gravitational field, the same devices will operate in the same way using an inertial field. This inertial field can be provided by rotating the entire device, including pulleys, belts and water baths about an axis near the top of the device. This will provide a centrifugal inertial field with the advantage that the field strength can be controlled by controlling the speed of rotation of the device.

Figure 1:
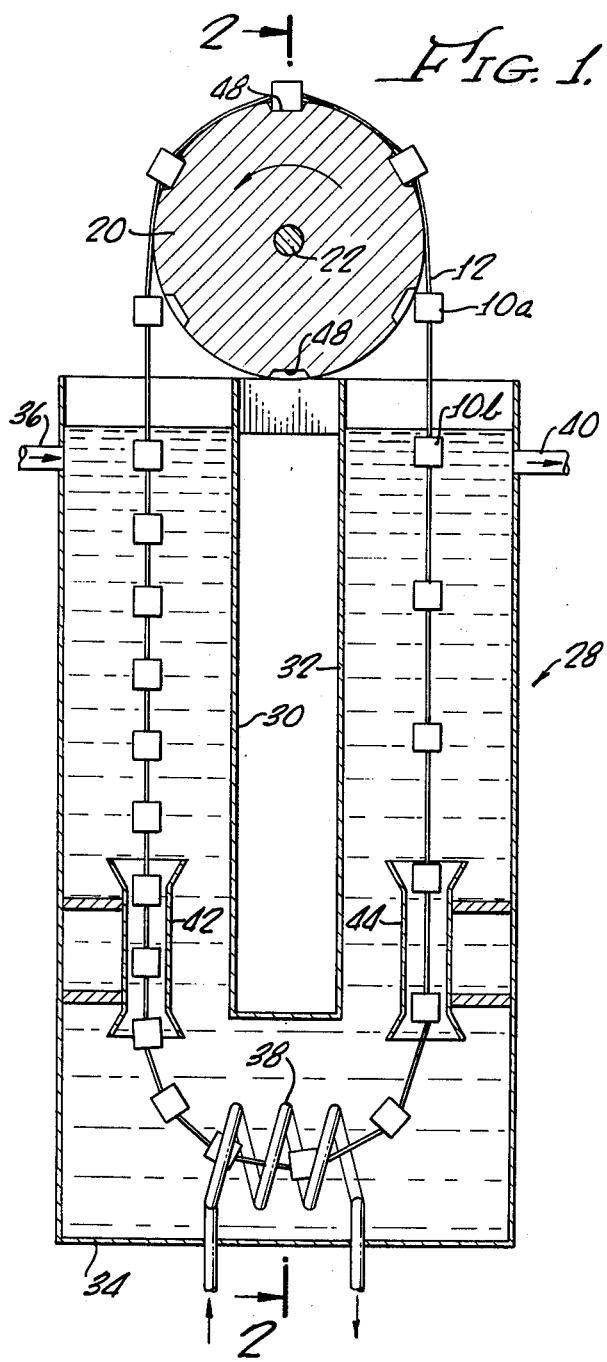
FIG. 1 illustrates an embodiment of the present invention particularly adapted for operation in a gravitational field.

Referring now to FIG. 1, an endless loop or belt forms a force transmitting medium and is comprised of a number of mutually discrete massive elements, such as 10a, 10b interconnected by a length of a wire formed of a Joule effect or shape memory material. Preferably, the material is Nitinol, the titanium nickel alloy described in U.S. Pat. No. 3.403,238 and in the Inter-Society Energy Conversion Conference paper identified above. Nevertheless, the invention contemplates the use of other types of Joule effect or shape memory materials. Each massive element 10a, 10b, etc., is a small solid of high density, such as iron or lead and is secured to the shape memory wire 12 by means of pressure of a button 14 passed against the wire by a spring 16 that is held in place by a screw 18 threaded into an aperture on the body of the massive element 10a.

Figure 2:
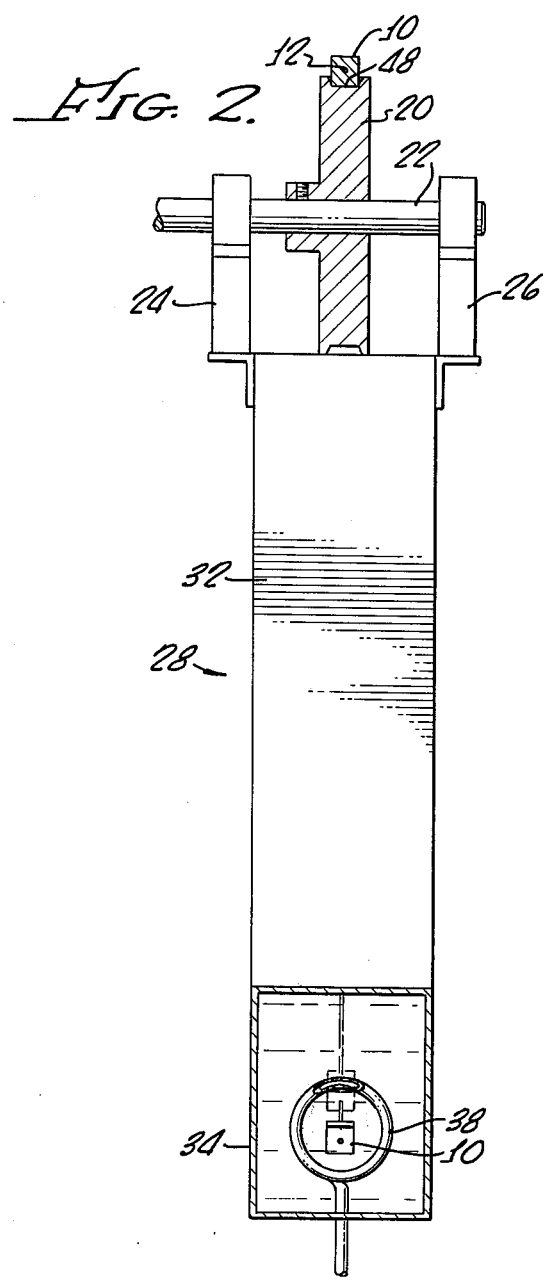
FIG. 2 is a side view of the apparatus of FIG. 1.

The force transmitting belt is entrained over a pulley 20 mounted on a shaft 22 carried in suitable supports 24, 26 (FIG. 2) for rotation about the shaft axis. The shaft supports are fixed to the top of a U-shaped container 28, having first and second legs 30, 32 interconnected at the lower end thereof by a bight section 34. A relatively high temperature fluid, such as hot water, for example, flows into the container 28 via an input conduit 36 at the upper end of leg 30 and thence flows downwardly through this leg, through the bight section where it is cooled by contact with a coiled cooling conduit 38 through which a much cooler fluid, such as cold water, is caused to flow continuously. Thus, the water flowing from leg 30 through the bight 34 is cooled, and thence at a lower temperature flows upwardly through the leg 32 where it is drained via a conduit 40.

The endless belt of discrete massive elements 10a, etc. interconnected by the Nitinol wire 12 has a first side that hangs in the hot water in leg 30 of the container and extends through the coil conduit 38 to a second side of the belt that extends along the length of container leg 32.

The described arrangement causes the Nitinol wire to pass through repetitive cycles in which the wire is cooled as it passes through the bight 34 and then is stretched by the force on the wire that tends to move the belt in a counterclockwise direction, against the weight of the masses on the side of the belt within leg 32. Thus deformed, the wire continues over the pulley and enters the heated water of leg 30 where it extracts thermal energy from the water and converts this energy into a change in configuration, namely, a contraction of the wire.

The discrete weights 10a, etc. are secured to the wire such that when all of the weights and wire have the same temperature and history, the spacing is equal. More specifically equal masses of Nitinol are provided between adjacent weights. Although the distance between weights will change as the wire expands and contracts, the mass of Nitinol shape memory material between adjacent weights remains the same.

Stretching of the cooled wire 12 in the cold leg 32 causes the weight to be spaced by relatively great distances and thus to have a relatively low density. When the Nitinol wire contracts in the hot leg 30, the weights are caused to be spaced apart by smaller distances and thus to have a greater density. It is the density of portions of the belt (the collective density of the weights) that varies, and not the density of any individual weight or wire portion. Operation is such to maintain this condition as long as the leg 30 is filled with the hot water and leg 32 is filled with the cold water. The greater density of weights on the left side of the belt (as viewed in FIG. 1) as compared to the lower density of weights on the right side of the belt, interacts with a gravitational field to produce a net force on the belt that drives the belt in a counterclockwise path around the pulley 20 and through the container 28. The belt merely hangs from the pulley 20.

If deemed necessary or desirable, additional guide tubes 42, 44 may be fixed to the container to help guide the belt in its path through the hot and cold legs of the container. Thus, it will be seen that the arrangement maintains the hot side of the belt of Nitinol wire and discrete weights heavier than the cold side and a net counterclockwise torque is applied to the pulley. Mechanical power is extracted by suitable connection (not shown) with the driven pulley shaft 22. To recapitulate the operation, as the belt rotates continuously in the indicated path about the pulley, and through the container, the closely spaced weights on the hot side of the container move out of the warmer water and into the cooler water. As the Nitinol is cooled, the belt starts to ascend leg 32 and tension is applied to the Nitinol wire to lift the weights as the belt rotates. Since the Nitinol wire is now at a relatively lower temperature this tension causes the wire to stretch, spacing the attached weights further apart in which condition they pass over the pulley 20 and enter the hot water. The wire is now heated and contracts due to the Joule effect, reducing the spacing between the weights and restoring the high density of these weights on the left side. The net effect, therefore, is that the Joule effect maintains a high mass density on one side of the belt and this high mass density reacts against the gravitational field which tends to move the high density weights downwardly to provide a mechanical work output.

In order to minimize slippage of the belt upon the pulley, the latter is formed with a plurality of recesses 48 spaced about the periphery of the pulley so as to receive and seat each of the weights in the cooled and stretched configuration of the Nitinol wire. The hot water is employed to act directly upon the Nitinol wire. Exchange of heat between the masses and the hot or cold water is not desired. Accordingly, the weights preferably are insulated to avoid heating and cooling of these elements as they pass through the hot and cold legs of the container 28.

It will be seen that the belt passes through a first station comprising leg 30 in which the gravitational field exerts a force on the reactive elements 10a, etc. extending in the direction of belt movement. At this first station the belt is caused to have a high density. The belt moves through a second station comprising the container leg 32 in which gravity has an opposite direction with respect to the belt movement, exerting a downward force on the reactive elements as the belt moves upwardly. At this second station, the belt has its low density configuration. Stated otherwise, the belt in a heated high density configuration passes through a first section of its closed loop path in container leg 30 and then is cooled and deformed in path sections that follow the first section.

Many modifications of the structure of the belt may be employed without departing from principles of the present invention. Broadly, for use in a gravitational force field, the belt comprises a plurality of discrete masses that are interconnected by a shape memory material having low and high temperature configurations such that the masses have a first density when the material is in low temperature configuration and a second density when the material is in a high temperature configuration. The arrangement shown in FIG. 1 causes the masses to have a high density when the material is in high temperature configuration. In other arrangements, to be described hereinafter, the interconnection of shape memory material and discrete reactive elements is such that the elements are caused to have a low density when the shape memory material is in its high temperature configuration and to have a high density when the shape memory material is in its low temperature configuration.

Illustrated in FIG. 4 is a modified arrangement analogous to that shown in FIG. 1 and which may be employed for the belt of FIG. 1. In this modified belt the masses comprise discs 50 of a high density material, such as lead for example, which are connected to spaced points along a Nitinol wire 52 shaped in the form of a helix by interconnecting the helix with first and second extending ears 54, 56 of the disc, the connection being sufficiently loose to allow the helix freedom of expansion but tight enough so that each disc is held in association with a single coil of the helix. With this arrangement the ratio of force achieved to the amount of density change can be optimized by selecting the optimum wire and helix diameters. The helix configuration stresses the Nitinol in torsion, so the Nitinol is not utilized as efficiently as if wire or sheet in pure tension were used. The advantage of the ability to control the force-to-density change ratio of the helix outweighs the relative inefficiency of utilization of shape memory material for some applications.

As an example of a small heat engine employing a belt of the type shown in FIG. 4, in a heat engine of the type illustrated in FIG. 1, there would be used a Nitinol wire formed into a helix having a 1.49 millimeter radius wound from two meters of 0.021 inch diameter wire. The helix is annealed in a closely wound configuration. One hundred lead discs 2.82 millimeters in radius and 1 millimeter thick each weighing three grams are fixed to the Nitinol wire as illustrated in FIG. 4. Hot water entering the container is approximately 50° C and cooled water leaving the container is below 15° C. Such a small device will lift against a force of 2.3 Newtons from an extension of 250 turns per meter to an extension of 755 turns per meter and may be readily scaled upwardly for greater amounts of output energy.

FIG. 1 shows an arrangement in which the reactive elements of the force transmitting belt are masses and the force field is gravity. Other force fields that may be employed in carrying out principles of the present invention include inertial fields, electrostatic fields and magnetic fields. Masses would be employed as reactive elements of the belt for use with an inertial field, electrostatically charged elements would be employed for reactive elements for use in an electrostatic field, and either permanent magnets or magentically permeable, low reluctance magnetic material would be employed for use in magnetic fields.

Figure 5:
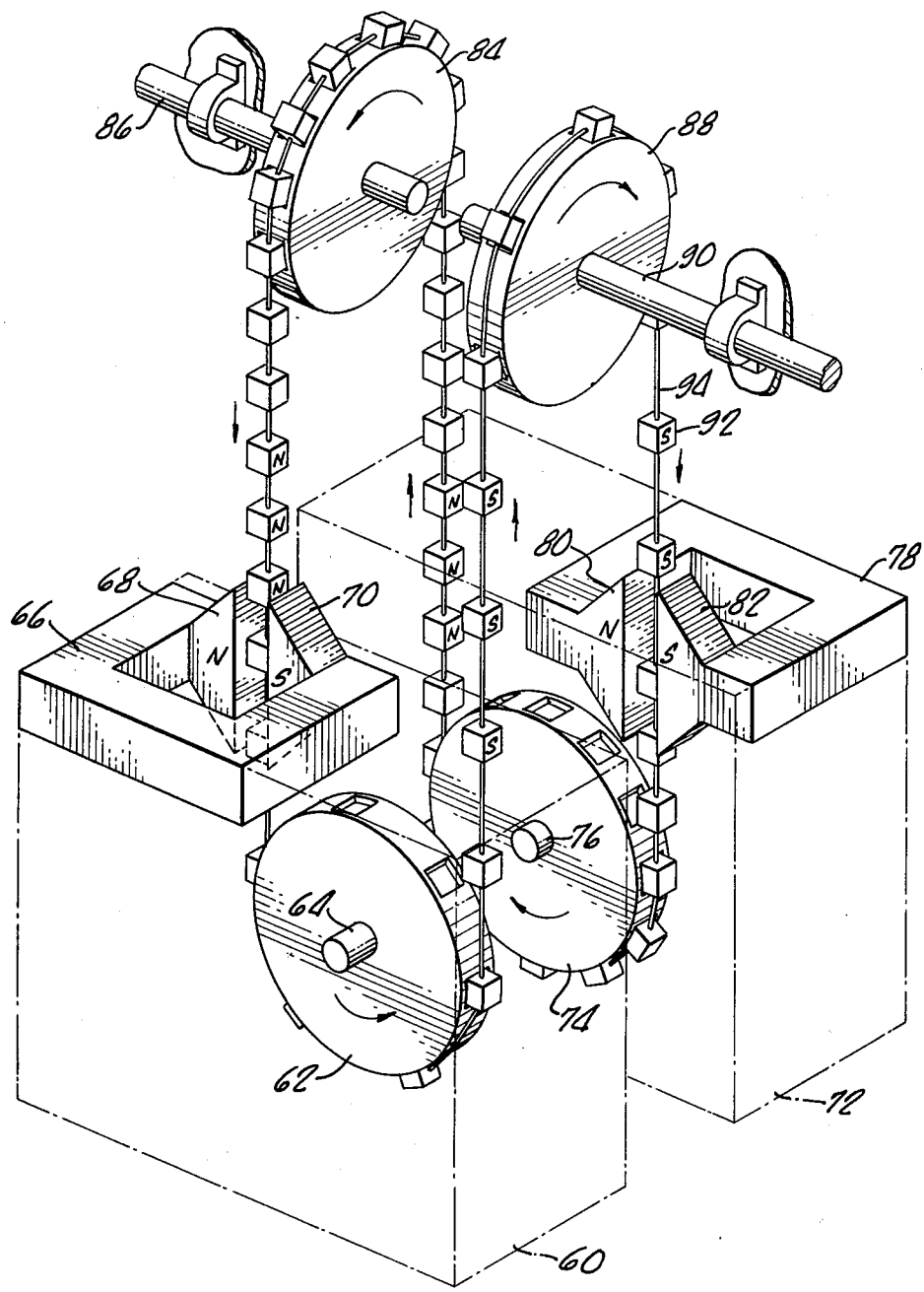
FIG. 5 shows a modification of the invention employing a magnetic field operable on a varying density belt of magnets.

Illustrated in FIG. 5 is an arrangement employing magnetic fields and in which the reactive elements of the belt are formed as permanant magnets. A first tank 60 contains a body of cold water and has a pulley 62 mounted for rotation therein upon a shaft 64. A C-shaped permanent magnet 66 is fixedly carried at the top of the tank and has a plurality of facing and mutually spaced vertically elongated pole pieces 68, 70 defining a gap therebetween which extends through the surface of the water in tank 60, extending both above and below this surface. A second tank 72 containing hot water carries a second pulley 74 mounted for rotation therein upon a shaft 76. A second C-shaped permanent magnet 78 is affixed to the top of tank 72 and has elongated pole pieces 80, 82, forming a vertically elongated gap that crosses the surface of the hot water and extends both above and below this surface. A third pulley 84 is carried on a shaft 86 that is fixedly supported with respect to the tanks 60 and 72. A fourth pulley 88 is carried upon a fourth shaft 90 that is independent of shaft 86 and suitably fixed to the tanks 60, 72.

Figure 3:
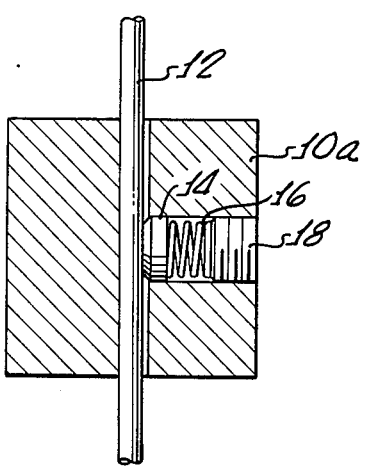
FIG. 3 is a detailed illustration of the attachment of a mass to the shape memory wire.

A force transmitting belt is formed of a plurality of permanent magnets 92 mutually spaced along the length of the belt and interconnected by a length of shape memory wire, such as Nitinol wire 94. The magnets may be firmly secured to the wire 94 in a manner similar to the attachment of weights 10 to wire 12 as illustrated in FIG. 3.

The belt is entrained over the several pulleys following a path from pulley 84 extending vertically downward through the gap between poles 68, 70, thence under pulley 62 and vertically upwardly to pulley 88, over pulley 88 and vertically downwardly through the gap between poles 80 and 82, down and under pulley 74 and vertically upwardly from pulley 74 back to its entrainment over pulley 84.

Poles 63 and 70, in this exemplary embodiment, are north and south, respectively, and similarly, poles 80 and 82 are north and south, respectively. With this arrangement the permanent magnets are oriented so that the south poles of the respective magnets 92 are adjacent to south pole 82 as the small permanent magnets traverse the gap in magnet 78 and the north poles of the small magnets 92 are adjacent to the north pole 80 of the magnet 78 as these magnets traverse this gap. As the magnets 92 traverse the gap in magnet 66 on the other hand, the orientation of the small magnets is such that the north poles are adjacent and facing the south pole 70 and the south poles of the magnets are adjacent and facing the north pole of the large magnet. Thus, an attractive force is exerted by the magnet 66 upon the permanent magnets 92 and a repulsive force is exerted by the permanent magnet 78 upon the small magnets 92.

Considering magnet 66, the belt leaves the hot tank 72 with the Nitinol in its high temperature configuration, which is a relatively contracted state. Thus, the magnets 92 are spaced closely to one another and are in a high density configuration. In this high density configuration they traverse pulley 84 and approach the upper end of the elongated gap of magnet 66. A relatively large attractive force is exerted by the magnetic field of magnet 66 upon the approaching high density magnets 92. As each discrete magnet 92 approaches the center of the vertically elongated gap of magnet 66, it enters the cold water in tank 60 and its associated Nitinol shape memory wire is cooled. The downward force exerted upon the wire between pulley 62 and pulley 84 causes the now cooled wire to be deformed from its low temperature configuration, stretching the wire and thereby causing the magnets to be spaced apart by greater distances and to assume a low density position.

The permanent magnets 92 are in this low density position as they move downwardly from the lower end of the gap of magnet 66. Therefore, the attractive force exerted by the magnet 66 upon the magnets 92, which tends to pull these magnets upwardly, back toward the magnet 66, is considerably less than the attractive force exerted by magnet 66 upon the magnets 92 as they approach the upper end of the magnet 66. Thus, a net downward force is produced by reaction of the magnet elements 92 with the magnetic field of magnet 66 upon the portion of the belt between pulleys 84 and 62. This tends to drive the belt in a direction that turns the pulleys as indicated by the arrows. This operation is illustrated in the detail of FIG. 6. From inspection of FIG. 6, it can be seen that the attractive force of the magnetic pole pieces 68, 70, upon the portion of the downwardly moving belt that is above the water surface 61 is relatively large because of the close spacing and increased density of the magnetic elements 92. Because of the relatively increased spacing and lower density of the magnetic elements in the lower half of the gap, within the cold water, the magnetic attractive force on this portion of the belt is relatively less. Therefore, there is a net attractive force of the magnetic pole pieces 68, 70 upon the belt that tends to urge the belt downwardly as viewed in FIG. 6.

The belt remains in its deformed configuration as it moves upwardly from pulley 62 over and around pulley 88 and approaches the second magnet 78. The small magnets are now in low density condition and as they approach the upper end of the gap between pole pieces 80 and 82, they react therewith so that the magnet 78 exerts a repelling or upwardly directed force on these low density magnets 92. As the magnets 92 reach the center of the vertically elongated gap of magnet 78, they enter the hot water of tank 72, the Nitinol wire contracts and the belt is reshaped to the high density positioning of the discrete magnetic elements 92. In this high density position the magnets 92 leave the lower end of the gap of magnet 78 and are repelled by the magnetic field with a greater repulsive force than that exerted by the magnetic field upon the magnets 92 at the upper end of the gap. Thus, the magnetic field of magnet 78 exerts a net downward force upon the belt as it traverses this gap. This net downward force acts upon the belt in the same direction as does the net force exerted upon the belt by the magnet 66 and also tends to drive the pulley in the direction indicated by the arrows. This operation is illustrated in the detail of FIG. 7. The operation of the arrangement of the magnetic pole pieces 80, 82 with the magnetic elements 92 now oriented for repulsive reaction is similar but reverse to that described in connection with FIG. 6. The upward repulsive force exerted by the pole pieces 80, 82 upon the relatively greatly spaced and low density magnetic elements 92 is less than the downward repulsive force exerted by these pole pieces upon the more closely spaced higher density magnetic elements that are immersed within the hot water below the surface 83. Thus, there is a net downward force, as viewed in FIG. 7, exerted by the magnetic field of pole pieces 80, 82 upon the belt which tends to move the belt downwardly as viewed in FIG. 7.

Thus, the belt is continuously driven by the heat energy of the liquid in containers 60 and 72 together with the reaction of the magnetic field upon the reactive elements of the belt. The magnets 92 with magnetic elements 92 pass through a first station (above the water) as they enter the field of magnet 66, with the Nitinol wire in its reshaped low temperature configuration. In this high density condition, the reactive elements are subjected to the magnetic field at the upper portion of the gap. Then the shape memory material is cooled and deformed in a second station which comprises the belt path below the water, adjacent the bottom portion of the gap magnet 66. A similar series of operations occurs with respect to the second magnet 78 and all of the steps are then cyclically repeated as the belt continues to move along the path to which it is constrained by the several pulleys. As in the arrangement of FIG. 1 the pulleys may be provided with recesses (not shown in FIG. 5) to minimize slippage between the pulleys and the belt. Further, just as in the arrangement of FIG. 1, the Nitinol wire may take a sinuous, convolted or helical form, other than the straight form indicated, to provide greater masses of the shape memory material between adjacent magnetic elements. Other arrangements for interconnecting the reactive elements will be described below and any of such arrangements may be utilized for the belt of the system of FIG. 5 or for the belt of the system of FIG. 1.

Figure 15:
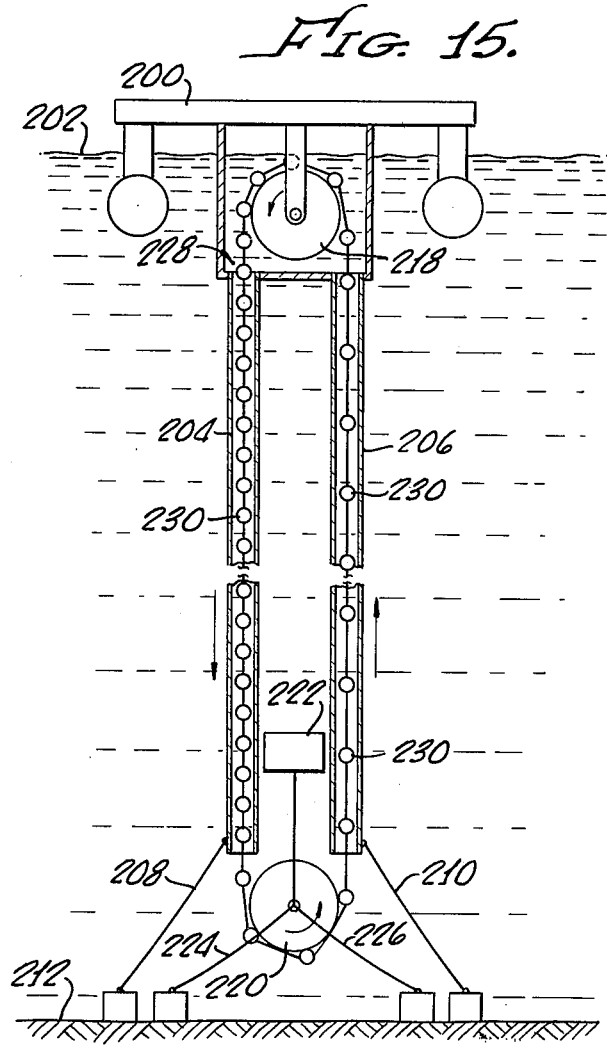
FIG. 15 shows an embodiment employing temperature difference between upper and lower regions of a body of water.

It will be seen that the embodiments heretofor described employ shape memory material to vary the density of reactive elements and thus achieve motion of these elements. This motion is then converted to a useful output energy by means of a power output shaft connected to any one of the pulleys around which the belt is entrained. Motion of the belt may be converted to useful energy in many different ways that will be readily apparent to one skilled in the art. In some cases, the very motion of the belt itself may be the desired output energy, as for example, where the belt is caused to move through a fluid which in turn is to be moved by the moving belt. Such an arrangement is shown in FIG. 15, to be described below. Further, the output shaft may be employed to drive electric power generators or electrical power may be generated directly from the moving belt itself when the force field employed with the varying density belt is a magnetic field. The latter arrangement is illustrated in FIGS. 8, 9, 10 and 11.

As shown in FIGS. 8 and 9 first and second tanks 104, 106 carry cold and hot water respectively and contain pulleys 108, 110 mounted on shafts 112, 114 for rotation within the water contained within the tanks. A set of three additional pulleys 116, 118 and 120 are mounted for rotation on axes parallel to the axes of shafts 112, 114 and spaced therefrom as illustrated in FIG. 8. Pulleys 116 and 120 are positioned directly above pulleys 108 and 110, respectively, and pulley 118 is positioned somewhat centrally of the other four pulleys as shown in the drawing. This arrangement is exemplary only. A force transmitting belt is extrained over the pulleys and guided to move in an endless path that includes a section in which the belt passes downwardly between the faces and through the gap of pole pieces 122, 124 of a permanent magnet 126 mounted near the top of container 104. The magnet provides a vertically extending elongated gap that has its midpoint set substantially at the surface 105 of the water in tank 104.

The force transmitting belt comprises a number of discrete reactive elements in the form of transverse laminated iron bars 130 (FIGS. 9, 10) having little permanent magnetism but a low magnetic reluctance. The shape memory material that interconnects bars 130 is not straight but takes a zig-zag path. This shape memory material is formed of two wires 131, 132, each extending diagonally between opposite ends of adjacent ones of the reactive elements 130 to form a substantially diamond shaped pattern of the two shape memory wires. This configuration, like the helix, allows the ratio of the forces in the belt to the density change in the belt to be controlled by dimensional changes in the geometry, such as changing the angle between the axis of the Nitinol wire and the direction of the extent of the belt. With the wires 131, 132 lying almost parallel to the reactive element 130 (which here acts also as a compression member), the belt force required or generated is much smaller for a required change in the distance between two reactive elements 130, than if the wires 131, 132 are nearly parallel to each other and perpendicular to the reactive elements 130. This configuration offers less ability to optimize the force-to-density change ratio than the helix, but, on the other hand, uses the shape memory alloy more efficiently since the wires or sheets are in pure tension. A greater number of the shape memory wires may be employed between successive reactive elements in order to further increase the forces generated upon heating these wires and causing them to resume their low temperature configuration.

The heat engine of FIGS. 8 and 9 operates in a manner substantially similar to the heat engine of FIG. 5 to drive its belt. Pole pieces 122, 124 exert attractive forces upon the varying density belt and reactive elements 130 thereof just as the magnets 66 of FIG. 6 exerts attractive forces upon the reactive elements 92. The reactive elements of the system of FIGS. 8 and 9 are in a high density configuration after leaving the hot water of tank 106 and traversing pulleys 120 and 116. Thus, a relatively great attractive force (exerted downwardly as viewed in FIG. 8) is exerted on the high density magnetic elements as they approach the surface 105 of the cold water in tank 104. As the shape memory wires enter the water, they are cooled and tension in the belt causes them to stretch to a deformed configuration in which the reactive elements interconnected by the shape memory wires assume a low density configuration. Therefore the attractive force exerted upon these magnetic elements below the surface of the water is less than the attractive force exerted upon the magnetic elements above the surface of the water. Accordingly, a net downward force is exerted by the magnetic field upon the force transmitting belt and the latter is driven in a counter clockwise direction as indicated by the arrows in FIG. 8.

Useful power output may be obtained in the apparatus of FIGS. 8 and 9 just as described in connection with the apparatus of FIGS. 1 and 6, by employing any one of the pulley shafts as a power takeoff. However, the arrangement may also be used for directly generating electricity as illustrated in FIGS. 8, 9 and 11. A plurality of electrically conductive coils 134, 136 and 138 (and others, not shown) are embedded in the faces of both of the pole pieces 122 and 124 so that these coils are cut by magnetic flux lines which are caused to vary as each soft iron reactive element 130 passes the gap. This flux variation is enhanced by making the gap between pole faces 122 and 124 somewhat longer (in a direction normal to the pole face) than the comparable gap of the magnets of FIG. 5, and also making the reactive elements 30 proportionately longer in a direction extending from one pole face to the other. With this configuration, the magnetic field between the pole faces has a relatively lower density in the absence of a magnetic element 130 therebetween and has a considerably higher flux density at positions where the pole pieces 122, 124 are bridged by the magnetic elements 130. This change in flux density as the magnetic elements 130 traverse the elongated gap induces electrical current in the several coils 134, 136, and 138. Each of the coils is connected in an electrical circuit including a respective one of capacitors 140, 142 and 144. The latter are chosen to tune the inductance capacitance circuit provided thereby to a frequency corresponding to the rate of passage of magnetic elements 130 along the inductive coils. Output loads, schematically represented by resistors 146, 148 and 150, are connected across each tuned circuit of capacitor and coil for utilization of the electrical energy generated by passage of the reactive elements.

The arrangements of FIGS. 8 through 11 for providing a power output takes advantage of the varying flux density that is inherently produced by the passage of the magnetic elements 130 through the magnetic field. This varying flux density is produced by the reaction of the magnetic field and magnetic elements 130 which reaction is itself employed to drive the belt. The very reaction which is employed to drive the belt also produces the varying flux density. Thus, relatively little additional apparatus is needed to provide direction generation of output electrical energy.

Figure 12:
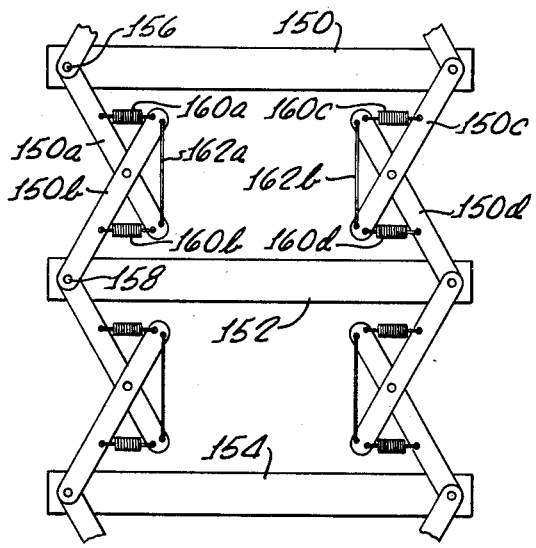
FIG. 12 shows a modified form of shape memory loop.

As previously mentioned, many different arrangements of reactive elements interconnected by shape memory material to provide different densities may be employed for the force transmitting belts of the described heat engines. One of such arrangements wherein the deforming force is supplied, at least in part, by energy stored in an elastic element is illustrated in FIG. 12. As shown in this figure, the force transmitting belt comprises a plurality of spaced parallel structural members 150, 152 154 interconnected by first and second pairs of links 150a, 150b, 150c and 150d and similar pairs of links interconnecting each of the other pairs of adjacent members 152, 154, etc.. Links 150a and 150b of a pair are pivoted to each other at points intermediate to their ends and have first end portions of respective links pivoted to respective ones of the bars 150, 152 at points 156 and 158, respectively. The links of each pair have portions thereof that are closer to the respective bars 150, 152, etc., interconnected by elastic elements, such as steel tension springs 160a, 160b and 160c, 160d and the free ends of the links of each pair, positioned inwardly of the belt, are interconnected by lengths of a shape memory material, such as Nitinol wire 162a and 162b.

When the shape memory material 162a, 162b is cooled, the tension springs tend to contract thereby stretching and deforming the shape memory material from its low temperature configuration and increasing the spacing between the reactive elements 150, 152, etc., to place these in their low density configuration. Upon heating the shape memory material, it contracts to stretch the springs, thereby storing energy in these springs that is used to stretch the shape memory material when the latter is again cooled. It will be recalled that the forces exerted by the contraction of the shape memory material are considerably greater than forces required to elongate the shape memory material when it is cooled.

The belt configuration of FIG. 12 employs tension springs tending to spread the reactive elements apart and shape memory wires tending to bring these elements closer together when the wire is heated. Therefore the heating increases the density and the cooling decreases the density of the reactive elements, just as in the arrangements previously described.

Figure 13:
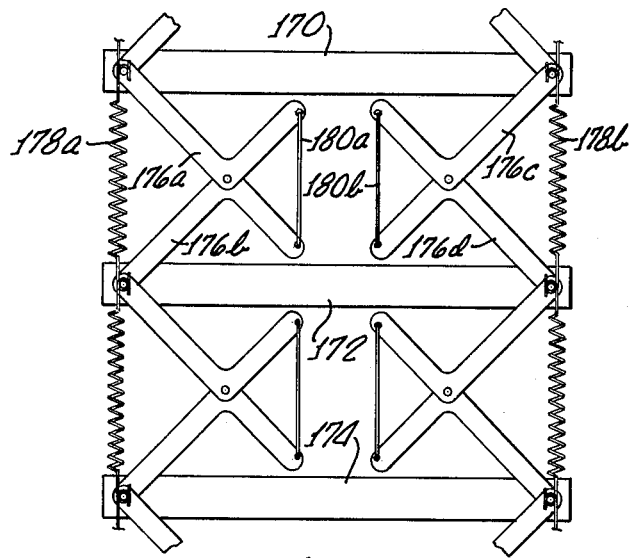
FIG. 13 shows still another form of shape memory loop.

FIG. 13 shows a modified belt similar to the belt of FIG. 12 but arranged with tension springs to provide a higher density when the shape memory material is cooled and a lower density when it is hot. In the arrangement of FIG. 13, the belt is formed of a plurality of parallel mutually spaced reactive bars 170, 172, 174, etc., interconnected by pairs of angulated links 176a, 176b, 176c and 176d. The links are pivotally connected together at their bends and each has an outer free end pivoted to a respective one of the reactive structural bars 170, 172, etc. These outer ends are interconnected by tension springs 178a, 178b, and the inner ends of the links of each pair are interconnected by shape memory wire elements 180a and 180b. The angulated configuration of the links is such that when the interconnected free ends at one side of the intermediate pivot point of a pair of links are moved toward each other the corresponding ends are moved away from each other and vice versa.

Accordingly, with the shape memory material in a cold condition, the tension springs will move the reactive bars 170, 172, etc., closer to each other, thus stretching the shape memory wires 180a, 180b. When the latter are heated, their contraction will spread the opposite ends of the associated links to thereby stretch the springs and store energy in these elements for subsequent deformation of the shape memory material upon cooling. Stretching the springs increases the spacing between the reactive elements and places the belt in low density condition.

The relative magnitudes of the resulting motion of the spring forces and Nitinol forces may be readily varied by varying the lengths of the links between their interconnecting pivots and the end portions thereof and also by varying the link configuration to increase or decrease the distance between corresponding ends interconnected by the springs or interconnected by the shape memory material. Further, the use of the crossed links allows a mechanical advantage to be provided in applying these spring forces to stretching of the shape memory material.

Figure 14:
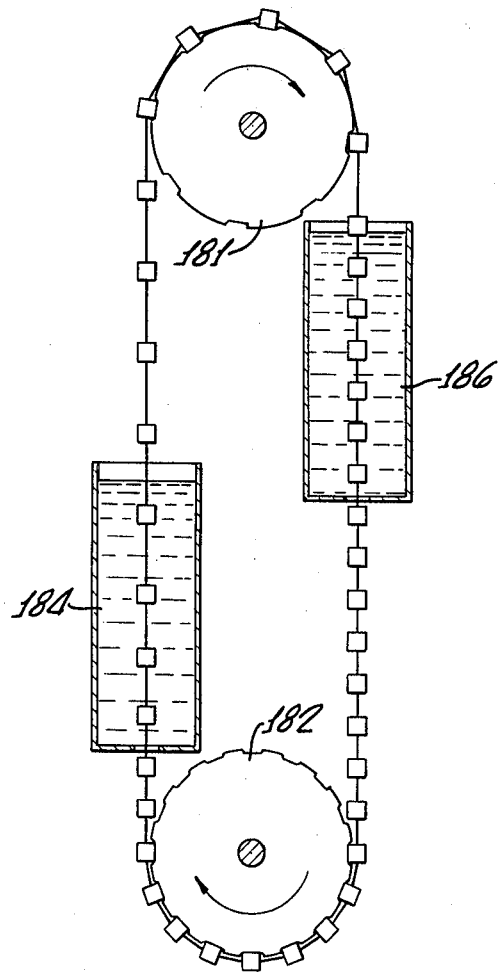
FIG. 14 illustrates a heat engine employing the shape memory loop of FIG. 13.

Illustrated in FIG. 14 is a system employing the belt of FIG. 13. In this arrangement, the belt is entrained over vertically aligned and vertically spaced pulleys 181, 182 and guided to move along a closed path upwardly through a first liquid container 184 and then downwardly through a second liquid container 186. Container 184 is supplied with a continuous flow of hot water which contacts the upwardly moving belt and which flows out of the container through an aperture adjacent its bottom, through which aperture the belt enters the container 184.

Container 186 is supplied with cold water, preferably injected at the bottom of the container so that most of it will flow upwardly and outwardly from the top of the container. Thus, a continuous flow of hot and cold water is provided, flowing in a direction opposite to the direction of movement of the belt. This counter flow of the water provides a more efficient heat transfer between the water and the shape memory material. As the belt enters the cold water in the container 186, the shape memory material is cooled. Stored energy in the springs 178a and 178b moves the outer most ends of the links of each pair toward each other to stretch the shape memory material and increase the density of the reactive elements 170, 172 in the gravitational field. The belt, in its high density condition, continues around the pulley 182 and enters the hot water of tank 184 which causes the shape memory material to contract, thereby stretching the springs 178a, 178b to store energy therein and to increase the spacing between the reactive elements 170, 172. The reactive elements have a sufficient mass such that their increased density, as maintained on the right or cold side of the loop of FIG. 14, as compared with the decreased density which is maintained on the left or hot side of the loop is such that the greater weight of the belt on the cold side reacts with gravity to move the belt and the pulleys in a clockwise direction. Useful output energy is derived from one or both of the pulley shafts.

As previously mentioned, output energy may be extracted from the moving belt by motion of the belt through a fluid. Thus, the belt arrangements, when moving through a body of water will inherently tend to cause motion of the water in the direction of the belt. This tendency can be considerably magnified by forming the belt with auxiliary paddle or dish-shaped elements which tend to entrap or entrain additional amounts of water and thus carry such water along with the belt. Such an arrangement is readily adapted to use existing temperature differences in an ocean, a lake or the like, as a source of heat. Thus the difference in ocean temperature at upper and lower regions may be employed to power a heat engine that either moves water in the ocean or generates useful output energy, or both.

In the culture of fish within the ocean, it is often desirable to pump cold nutrient laden water from the ocean bottom to the surface where this nut ent water may be efficiently employed to support fish of various types. It is known that in many areas the cold water at the ocean bottom contains large quantities of nutrients which are beneficially used by fish if such water can be brought to the surface. Further, it is known that areas of relatively sharp temperature differences exist in the ocean, such areas being known as thermoclines and comprising, in effect, a relatively sharply delineated boundary between cold water below such thermocline and warmer water above such thermocline. Magnetic force field apparatus of the type illustrated in FIGS. 5 and 8 may be readily employed to extract the heat energy from the temperature difference of such a thermocline, with the elongated gap of the magnet extending vertically at the thermocline. Alternatively, gravitational apparatus of the type shown in FIG. 1 may be employed to use the ocean temperature differences to drive the reactive belt, pump the water from the bottom toward the surface and maintain the proper temperature differential for the two sides of the belt.

Such a gravitational field system is shown in FIG. 15. A floating platform 200 at the surface 202 of the sea (or lake, or the like) suspends a pair of vertically oriented stand pipes or open ended water guide tubes 204, 206 having anchor lines 208, 210 securing the stand pipes to the ocean bottom 212. A pulley 218 is suspended from the platform 200 and a second pulley 200 is provided with a floatation device 222 and anchor lines 224, 226 to securely position the pulley below pulley 218 adjacent the ocean bottom. There is provided a variable density force transmitting belt 228 having reactive elements in the form of weights 230 (discrete masses having a density greater than that of the water) interconnected by bodies of shape memory material in a suitable configuration, such as one of those previously described. The belt is entrained over the pulleys 218, 220 and is guided for motion between warm upper regions and cool lower regions through standpipe 204 and then around the lower pulley 220 for return through standpipe 206 in an endless loop to the upper pulley 218.

As the left side of the belt continuously moves downwardly (in a counter clockwise direction as seen in FIG. 15) and the Nitinol shape memory material enters the standpipe 204, it carries warmer water from the surface. This warm water is caused to flow continuously into and through the length of standpipe 204 from the water at the upper region of the sea. Nitinol is this standpipe 204 is therefore warmed and the belt masses are in their high density configuration.

The belt continues to move in this high density condition until it leaves the bottom of the standpipe 204, entering the cooler water at the ocean bottom. The Nitinol is now cooled and stretched to place the masses 230 in their low density condition. As the belt moves upwardly on the right side of the loop, through standpipe 206, the belt entrains cooler water from the ocean bottom and carries this water in a steady stream upwardly through standpipe 206, from which it is ejected near the surface. As the belt leaves the upper end of standpipe 206 it soon enters a region of warmer water which contracts the Nitinol to place the belt in its high density configuration. In high density condition the belt moves downwardly on the left side of the loop to continue its cyclic motion. Just as in the arrangement of FIG. 1, the left, downwardly moving side of the belt is maintained at a higher density than the right side and a net gravitational force is produced that drives the belt in a counter clockwise direction as viewed in FIG. 15. The two sides of the belt are spaced horizontally a sufficient distance so that the water currents formed by the belt-entrained water, flowing upwardly with the belt on the right side and downwardly with the belt on the left side, do not significantly interfere with one another as they flow out of their respective standpipes. Preferably, for long term operation, some means, such as natural water currents at the top and bottom of the standpipes, will replenish the warm water and disperse the cool water (flowing from the standpipe 206) at the top, and replenish cool water and disperse warm water (flowing from the standpipe 204) at the bottom. If deemed necessary or desirable, suitable paddles or other devices (not shown) to more efficiently entrain water may be provided on the belt 228 to increase the flow of the water currents entrained by the upwardly and downwardly moving belt sides. Although it is preferred to use some means, such as standpipes 204, 206 to guide the upwardly and downwardly flowing water currents, it is possible to space the two vertically oriented belt sides (using plural pulleys at both top and bottom) a distance sufficient to afford adequate isolation of the upwardly and downwardly moving currents with only baffles or partitions, or with no mechanical separator or guide at all.

There have been described methods and apparatus for employing shape memory material to convert heat energy into density variations of reactive masses in an energy field and to thereby cause motion of such masses relative to such field, thus providing many new, useful and widely applicable types of efficient heat engines.

The "diamond" belt configurations of FIGS. 9 and 10, the "scissor" belt configurations of FIGS. 12 and 13, the helix configuration of FIG. 4, and variations of these may be used in shape memory heat engines other than those based on force field reactions. Such other engines include those of the types referred to in the several patents and publications identified above.

In some applications and configurations of force field reactive engines of the type described herein, and particularly those employing a gravitational field, discrete masses, other than the shape memory material itself, may be eliminated since the weight or mass of the shape memory material itself will provide sufficient reaction with the gravity. Thus, for example, the belt of FIG. 15 may be made as a continuous cable of shape memory material, eliminating weights 230, and carrying only suitably shaped devices for enhanced water entrainment, if deemed necessary or desirable. In such an arrangement, employing a belt made of a continuous length of shape memory material, the change in density of the belt (which is not necessarily a change in density of the shape memory material) is due to the change in cross section of the shape memory material from a relatively longer, more slender shape to a relatively shorter, greater diameter shape.

The foregoing detailed description is to be clearly understood as given by way of illustration and example only, the spirit and scope of this invention being limited solely by the appended claims.

What is claimed is:

1. A thermal energy converter comprising,
 a belt including
  a body of shape memory material having different low and high temperature configurations, and reactive elements interconnected by said body of shape memory material to have different densities of said elements when said material is in said low and high temperature configurations, respectively,
 a force field that tends to move said elements in a forcing direction relative to said field,
 first and second stations positioned in said force field so that said force field has mutually opposite forcing directions therein relative to said belt, means for guiding said belt through said stations in said force field, means for cooling and deforming said shape memory material, means for causing said shape memory material to have a relatively high temperature at said second station, and output means responsive to motion of said belt.

2. The converter of claim 1 wherein said belt comprises a plurality of interconnected pairs of mutually pivoted links, corresponding first end portions of the links of one pair being interconnected by an elastic element and corresponding second end portions of the links of said one pair being interconnected by said body of shape memory material.

3. The converter of claim 1 wherein said force field is a gravitational field and wherein said reactive material elements comprise portions of said shape memory material.

4. The converter of claim 3 wherein said stations each extend substantially along said gravitational field and wherein said means for guiding includes means for guiding said material downwardly through one of said stations and upwardly through the other of said stations.

5. The converter of claim 3 wherein said belt includes first and second sides extending between upper and lower regions of a body of water in which the temperature is lower at said lower region, water flow isolating means extending between said upper and lower regions of said body of water, said first and second belt sides being guided along and separated by said water flow isolating means.

6. The converter of claim 1 wherein said force field comprises a magnetic field and wherein said reactive elements are formed of a magnetically permeable material, said first station being positioned in a first portion of said magnetic field and said second station being positioned in an adjoining portion of said magnetic field, whereby said shape memory material is at a first temperature as it enters said first station and is at a second temperature as it leaves said second station.

7. The converter of claim 6 wherein said reactive elements comprise a plurality of magnetically permeable bars, said body of shape memory material comprising a plurality of elongated members extending between said bars.

8. The converter of claim 6 wherein said reactive elements are permanent magnets.

9. The converter of claim 6 wherein said output means comprises a coil of electrically conductive wire positioned at one of said stations and electrically connected in an output circuit.

10. The converter of claim 9 wherein said coil is connected in a circuit tuned in accordance with the rate of passage of said elements.

11. A cyclic method of converting temperature difference to motion comprising,
a. employing a shape memory material to interconnect a plurality of elements that react to an energy field by a tendency to move relative to said field,
b. deforming said material from a low temperature configuration to relatively position said elements in a first density,
c. heating said deforming material to reshape said material toward said low temperature configuration and relatively position said elements in a second density,
d. subjecting said elements in said second density to an energy field that tends to move said elements relative to said field,
e. cooling said reshaped material, and
f. repeating steps (b), (c), (d) and (e).

12. In a heat engine wherein a shape memory material is subjected to varying temperature and stress to thereby vary its configuration as it traverses a path, the improvement comprising,
a force field along said path, and
a plurality of reactive material elements secured to said shape memory material at positions that are mutually spaced by distances that vary with variations of said configuration, said elements being responsive to said force field by a tendency to move in reaction thereto.

13. The heat engine of claim 12, wherein at least portions of said shape memory material form said reactive elements.

14. A thermal energy converter comprising,
an endless loop including,
a plurality of reactive elements that tend to move in a force field,
a shape memory material having different low and high temperature configurations, and
means for interconnecting said elements and material to position said elements in a first density when said material is in said low temperature configuration and in a second density when said material is in said high temperature configuration,
a force field,
means for guiding said loop along a closed path having a first section in said force field,
means for causing said loop to have an increased temperature in said path section whereby said elements are in said second density as the loop traverses said path section, and means for cooling and deforming said material in sections of said path following said first section.

15. The thermal energy converter of claim 14 wherein said force field comprises a magnet having an elongated gap, said loop being guided through said gap, said first path section being associated with one end of said gap and said following path sections being associated with the other end of said gap.

16. The thermal energy converter of claim 14 including a body of water having a relatively cold lower region and a relatively warm upper region, water separator means in said body of water extending from said lower to said upper region, said loop being guided in downwardly and upwardly moving sections with said water separator means interposed therebetween.

17. The thermal energy converter of claim 14 wherein said reactive elements comprise a plurality of structural members spaced along the length of said loop, a plurality of pairs of links, the links of each pair being pivotally connected to each other, a plurality of elastic elements, said elastic elements being connected between corresponding links of a respective one of said pairs of links, said shape memory material comprising a plurality of shape memory elements each connected to different points of corresponding links of a respective one of said pairs of links.

18. The thermal energy converter of claim 14 wherein said force field is a gravitation field, wherein said elements comprise mutually discrete masses, and wherein said shape memory material comprises an elongated member connected at spaced points to said masses.

19. The thermal energy converter of claim 18 wherein said elongated member comprises a helix formed of a shape memory material.

20. The thermal energy converter of claim 14 wherein said force field comprises a magnetic field and wherein said elements are magnetic.

21. The thermal energy converter of claim 20 wherein said elements are permanent magnets.

22. The thermal energy converter of claim 21 including an electrically conductive coil positioned in said force field adjacent said path to provide an energy output.

23. The thermal energy converter of claim 14 wherein said shape memory material comprises at least one length of angulated shape memory material extending along said loop.

24. The thermal energy converter of claim 23 wherein said shape memory material includes a pair of angulated lengths of material connected in a diamond configuration.

25. The shape memory material of claim 14 wherein said belt comprises a length of shape memory material portions of which comprise said reactive elements.

26. A thermal energy converter comprising,
a body of cold fluid,
a body of hot fluid,
a magnet associated with at least one of said bodies and having an elongated gap that extends at and transverse to a boundary of said one fluid body,
an endless loop including
a plurality of magnetic elements,
a shape memory material having high and low temperature configurations, and
means for interconnecting said elements and material to position said elements along said loop in densities that vary according to said configurations,
means for guiding said loop through said body of hot fluid, through said body of said cold fluid and back to said body of hot fluid, and through said elongated gap, and means for converting motion of said loop to output energy.

27. The converter of claim 26 wherein said last mentioned means comprises an electrically conductive coil.

28. The thermal energy converter of claim 26 wherein said means for guiding said loop includes a shaft, a pulley fixed to said shaft, said loop being entrained over said pulley, said shaft providing output energy in response to motion of said loop.

29. The thermal energy converter of claim 26 including a second magnet associated with the other of said bodies of fluid and having an elongated gap that extends across a boundary of said second body of fluid on both sides of said boundary, said loop being guided through said second elongated gap, said magnetic elements comprising discrete permanent magnets.

30. A thermal energy converter comprising,
a plurality of elements that react to a force field by a tendency to move relative to the field,
a shape memory material having different low and high temperature configurations,
means for interconnecting said elements and said shape memory material to position said elements in a first density when said material is in said low temperature configuration and in a second density when said material is in said high temperature configuration,
means for cooling said material,
means for deforming said material from said low temperature configuration to thereby position said elements in said first density,
means for heating said deformed material to thereby reshape said material toward said high temperature configuration and to position said elements in said second density, and
means for subjecting said elements in said high density positions to a force field tending to move said elements relative to said force field.

31. A thermal energy converter for use in a body of water having warmer water at an upper region and cooler water at a lower region, said converter comprising,
an endless belt including
a plurality of reactive elements that tend to move in a force field,
a shape memory material having different low and high temperature configurations,
means for interconnecting said elements and material to position said elements in a first density when said material is in said low temperature configuration and in a second density when said material is in said high temperature configuration, and
means for entraining water with said belt, and means for guiding said belt along a closed path extending between said upper and lower regions, whereby said belt is in contact with cooler water entrained therewith as the belt moves from the lower region and is in contact with warmer water entrained therewith as the belt moves from the warmer region.

32. The thermal energy converter of claim 31 wherein said belt includes a continuous length of shape memory material, portions of said length forming at least some of said reactive elements.

33. The converter of claim 31 including means for isolating water currents flowing upwardly with said belt from water currents flowing downwardly with said belt.

34. The converter of claim 33 wherein said last mentioned means comprises first and second mutually spaced water guides extending between said upper and lower regions, and wherein said closed path extends along said guides.

35. The converter of claim 31 including first and second water guide tubes extending between said upper and lower regions, said belt being guided to move downwardly through said first tube and upwardly through said second tube.

36. The converter of claim 31 wherein said force field is gravitational.

37. In a heat engine wherein a belt of shape memory material is subjected to varying temperatures and stress to thereby vary its configurations as it traverses a path, an improved belt comprising
a plurality of transverse members, and
a first length of shape memory material connected between one end of one of said members and an opposite end of adjacent members, and
a second length of shape memory material connected between the other end of said one member and opposite ends of adjacent members.

38. In a heat engine wherein a belt of shape memory material is subjected to varying temperatures and stress to thereby vary its configuration as it traverses a path, an improved belt comprising
   a plurality of pairs of mutually pivoted links, each having a first and second arm on opposite sides of its pivoted connection,
   means for elastically interconnecting the first arms of the links of one pair, and
   shape memory material means for interconnecting the second arms of the links of said pair.

* * * * *

UNITED STATES PATENT OFFICE
CERTIFICATE OF CORRECTION

PATENT NO. : 4,027,479
DATED : June 7, 1977
INVENTOR(S) : John S. Cory

It is certified that error appears in the above-identified patent and that said Letters Patent are hereby corrected as shown below:

Col. 4, line 16: Change "weight" to ---weights---.

Col. 6, line 54: Change "63" to ---68---.

Col. 8, line 39: Change "convolted" to ---convoluted---.

Col. 18, line 58: Change "configurations" to ---configuration---.

Signed and Sealed this

First Day of November 1977

[SEAL]

Attest:

RUTH C. MASON
Attesting Officer

LUTRELLE F. PARKER
Acting Commissioner of Patents and Trademarks